US012691740B2

(12) United States Patent (10) Patent No.: US 12,691,740 B2

Cackley et al. (45) Date of Patent: Jul. 28, 2026

(54) ELONGATE SEAL FOR SLIDE OUT ROOMS

(71) Applicant: ARNOLD JÄGER HOLDING GMBH, Hannover (DE)

(72) Inventors: Jason Cackley, South Bend, IN (US); Leon Bogucki, Rolling Prairie, IN (US); Makoto Sato, Michigan City, IN (US); Ray Young, Wanatah, IN (US)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 414 days.

(21) Appl. No.: 18/215,468

(22) Filed: Jun. 28, 2023

(65) Prior Publication Data

US 2025/0001850 A1 Jan. 2, 2025

(51) Int. Cl.
B60J 10/84 (2016.01)
B60J 10/27 (2016.01)
B60P 3/34 (2006.01)

(52) U.S. Cl.
CPC .............. B60J 10/84 (2016.02); B60J 10/27 (2016.02); B60P 3/34 (2013.01)

(58) Field of Classification Search
CPC .............. B60J 10/84; B60J 10/27; B60P 3/34
USPC ....................................... 296/26.13
See application file for complete search history.

(56) References Cited

U.S. PATENT DOCUMENTS

| | | | | |
|---|---|---|---|---|
| 4,497,137 A | * | 2/1985 | Nelson | E06B 7/231 |
| | | | | 49/495.1 |
| 5,300,171 A | * | 4/1994 | Braun | C09J 7/25 |
| | | | | 427/208 |
| 5,355,628 A | * | 10/1994 | Dranchak | B60J 10/38 |
| | | | | 49/490.1 |
| 7,669,370 B2 | * | 3/2010 | Oba | B60J 10/82 |
| | | | | 49/498.1 |
| 8,366,168 B1 | * | 2/2013 | Ksiezopolski | B60J 10/00 |
| | | | | 49/495.1 |
| 9,033,390 B1 | | 5/2015 | Ksiezopolski | |
| 9,045,027 B2 | | 6/2015 | Young | |
| 9,409,532 B2 | | 8/2016 | Ksiezopolski | |
| 9,625,037 B2 | | 4/2017 | Young | |
| 10,208,860 B2 | | 2/2019 | Young | |

(Continued)

OTHER PUBLICATIONS

3Mâ¢ Venture Tapeâ¢ Vinyl Foam Tape; https://www.3m.com/3M/en_US/p/d/b40069512/#:~:text=Due%20to%20the%20pairing%20of,wide%20range%20of%20challenging%20substrates. (Year: 2021).*

(Continued)

*Primary Examiner* — Hilary L Gutman

(74) *Attorney, Agent, or Firm* — Barnes & Thornburg LLP

(57) ABSTRACT

An elongated seal comprises a base having an upper side and a lower side. Further, a bulb portion is integrally connected to the base. Further a wiper extends co-linearly to the base, wherein the wiper is integrally connected to the base via its proximal end being opposite to a distal end of the wiper. In addition, locating leg extends substantially perpendicularly to the base and substantially perpendicularly with respect to the wiper, the locating leg being integrally connected to the base and extending downwards from the lower side of the base. A compressible sealing member extending at or underneath the lower side of the base. Further, a flipper is provided having a distal end and a proximal end, the proximal end being integrally connected to the base opposite to the locating leg.

15 Claims, 3 Drawing Sheets

(56)         References Cited

U.S. PATENT DOCUMENTS

| | | | |
|---|---|---|---|
| 10,323,749 B2 | 6/2019 | Maloney | |
| 2014/0001710 A1* | 1/2014 | Siegel | B60J 10/00 |
| | | | 277/630 |
| 2014/0097578 A1* | 4/2014 | Young | F16J 15/027 |
| | | | 277/628 |
| 2016/0201893 A1* | 7/2016 | Ksiezopolski | E04B 1/6815 |
| | | | 362/311.01 |
| 2018/0043844 A1* | 2/2018 | Ksiezopolski | F16J 15/027 |
| 2020/0317143 A1* | 10/2020 | Goode | B62D 63/061 |

OTHER PUBLICATIONS

Electro Tap; Polyethylene Foam Tape â Acrylic Adhesive â 651 Series; https://www.electrotape.com/product/polyethylene-foam-tape-acrylic-bulk/ (Year: 2020).*

NAIKOS: Types of Acrylic Foam Tape; https://www.china-adhesive-tapes.com/info/types-of-acrylic-foam-tape-80039533.html (Year: 2023).*

* cited by examiner

ELONGATE SEAL FOR SLIDE OUT ROOMS

BACKGROUND

The present disclosure relates to recreational vehicles, and particularly to recreational vehicles having slide-out rooms. More particularly, the present disclosure relates to seals for use with slide-out rooms for recreational vehicles.

SUMMARY

According to the present disclosure, an elongated seal for a sidewall is described, in particular a sidewall of a recreational vehicle. The sidewall has at least one corrugated surface with peaks and valleys having heights in the millimeter range, in particular, 5 mm to 8 mm, and a transverse surface extending substantially perpendicularly from the corrugated surface. The transverse surface is defining an opening in the sidewall for receiving a slide-out room that can be extended or retracted. In order to form a water-tight interface between both the seal is installed at the sidewall.

In illustrative embodiments, the seal comprises an elongated resilient base having an upper side and a lower side. Further, a bulb portion is integrally connected to the base in a cantilevered manner above the upper side of the base. The bulb portion has an arcuate portion extending into a sidewall portion and into an inner wall defining an enclosed space within the bulb portion. The bulb portion is movable between a first position in which the inner wall is substantially parallel to and spaced apart from the upper side of the base. Further, the bulb portion can be brought into a second position in which the bulb portion is bent away from the upper side of the base, in order to access the base from the upper side, e.g., for attaching the seal to the sidewall by screws.

In illustrative embodiments, a wiper is extending co-linearly to the base, wherein the wiper is integrally connected to the base via its proximal end that lies opposite to a distal end of the wiper. The distal end is defining a terminal end and is adapted to protrude into the opening of the sidewall for providing an additional sealing effect when rubbing against the sidewall of the slide-out room received in that opening. Further, a locating leg extends substantially perpendicularly to the base and substantially perpendicularly with respect to the wiper. The locating leg is integrally connected to the base and extends downwards from the lower side of the base, thus, in the opposite direction as the bulb portion.

In illustrative embodiments, a compressible sealing member extends at or underneath the lower side of the base being adapted to absorb or take the shape of the corrugated surface when the compressible sealing member is pushed against the corrugated surface in the installed state of the seal. Thus, due to its compressible nature, the sealing member located at the lower side or underneath the base is accepting the surface characteristics of the sidewalls corrugated surface being in the millimeter range, omitting gaps to be formed between the sidewall and the seal preferably on its entire length. Consequently, by selecting an appropriate resilient or compressible material for the compressible sealing member that is adapted to be compressed in the millimeter range, in particular, 5 mm to 8 mm, on applying a pressure, an effective sealing effect can be provided even the respective surface of the sidewall is not planar. Materials that can be used are thermoelastic polymers, e.g., polyethylene (PE), by way of example. Also, other resilient materials can be used. The compressible sealing member might be formed as a foam tape having a closed-cell structure or a combination of interacting resilient rubber bodies, each compressible sealing member being adapted to apply to the corrugated surface on applying a pressure.

In illustrative embodiments, in addition, a flipper is provided having a distal end and a proximal end, wherein the proximal end is integrally connected to the base opposite to the locating leg. The flipper is bent (vertically) downwards from the proximal end, i.e., away from the lower side of the base, and has a substantially concave curved shape between the distal end and the proximal end. As a consequence, the flipper is adapted to cover the compressible sealing member (laterally) sideways and, depending on its length, to also absorb or take the shape of the corrugated surface. This leads to a further protection of the compressible sealing member from the lateral side opposite to the locating leg, and to an additional sealing effect as water can be effectively kept away from the compressible sealing member by the flipper to a certain extent. Thus, the overall sealing effect of the seal can be improved.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figures 1, 2, 2A:
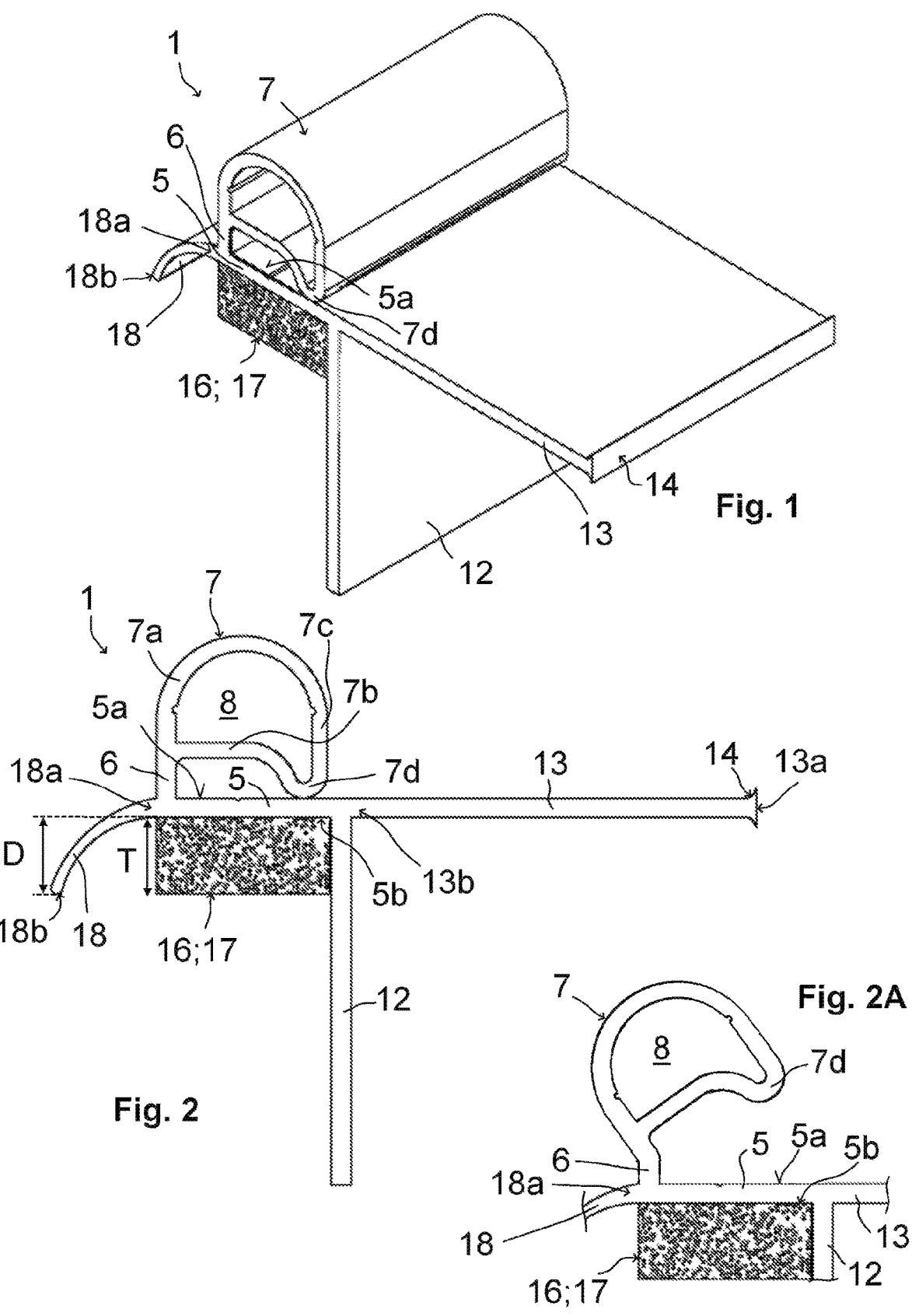
FIG. 1 is a perspective view of an elongated seal.
FIGS. 2 and 2A are sectional views of the elongated seal according to FIG. 1.

FIG. 1 shows an elongated seal 1 in a perspective view that can be attached to a sidewall 2 (see FIG. 3) of a recreational vehicle. The sidewall 2 has an opening 2a which is defined by a transverse surface 2e of the sidewall 2 for receiving a slide-out room (not shown) that can be extended or retracted in any suitable manner. The sidewall 2 has a corrugated surface 2b formed by peaks 2c and valleys 2d having heights in the millimeter range, in particular, 5 mm to 8 mm. According to an exemplary embodiment, the corrugated surface 2a may be formed on a metal siding, e.g., made of aluminum, that is attached to a wood framing, both of them forming the sidewall 2. However, also other structures or sidings having a corrugated surface 2a are possible.

The seal 1 has a base 5 and an offsetting member 6 extending perpendicularly from an upper side 5a of the base 5. The offsetting member 6 transitions into a bulb portion 7 such that the bulb portion 7 is integrally connected to or is one-piece with the base 5 in a cantilevered manner over the base 5. The base 5 might be of a harder resilient material than the bulb portion 7 for providing structure and support when installed on the sidewall 2. For example, the base 5 might be of a material of approximately 90 shore A.

The bulb portion 7 has an arcuate portion 7a extending into a sidewall portion 7b and into an inner wall 7c defining an enclosed space 8 within the bulb portion 7, wherein an additional protrusion 7d is formed between the sidewall portion 7b and the inner wall 7c. The material of the offsetting member 6 is chosen such that the bulb portion 7 can be bent upwards, away from the upper side 5*a* of the base 5 (see FIG. 2A) and at the same time the bulb portion 7 is biased into its position shown in FIGS. 1 and 2. i.e., the protrusion 7*d* formed in the bulb portion 7 is preferably touching the upper side 5*a* of the base 5 and/or the inner wall 7*c* of the bulb portion 7 runs substantially parallel to the base 5.

A locating leg 12 extends perpendicularly from a lower side 5*b* of the base 5, in the direction away from the bulb portion 7. Further, a wiper 13 having a distal end 13*a* and a proximal end 13*b* extends co-linearly from the base 5 and perpendicularly with respect to the locating leg 12. The wiper 13 has a flared tip 14 on its distal end 13*a* being wider than the portion of the wiper 13 adjacent to the flared tip 14. In the installed state of the seal 1, the locating leg 12 runs parallel and adjacent to the transverse surface 2*e* of the sidewall 2. In addition, the wiper 13 extends inwardly from the sidewall 2 or perpendicularly with respect to the transverse surface 2*e* into the opening 2*a* of the sidewall 2 and rub against a sidewall of the slide out room (not shown) with its distal end 13*a* or terminal end to form an additional sealing effect. Both, the locating leg 12 and the wiper 13, are integrally connected to or is one-piece with the base 5. Preferably, the locating leg 12 is made of the same durometer material as the base 5 providing support, whereas the wiper 13 is made of a lower durometer material as the base 5 allowing an easy bending of the wiper 13 when rubbing against the sidewall of the slide out room.

Figure 7:
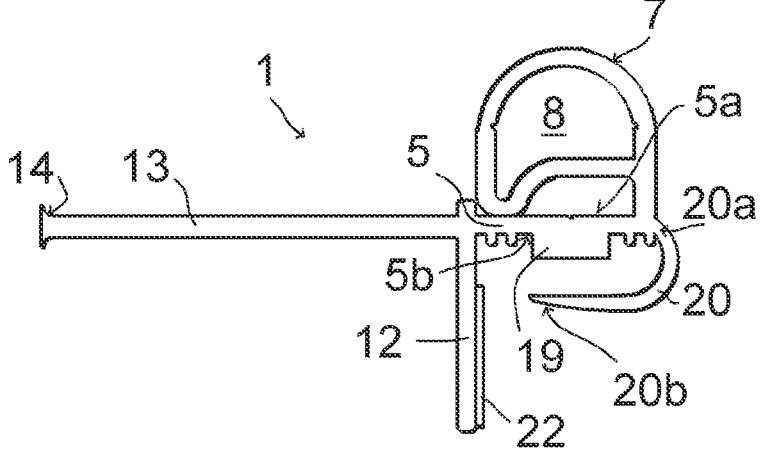

Further, a compressible or flexible sealing member 16 is located underneath the lower side 5*b* of the base 5 next to the locating leg 12. According to the embodiment shown in FIGS. 1 and 2, the sealing member 16 is a compressible foam tape 17, e.g., a thermoelastic or polyethylene (PE) or PVC foam tape having a closed-cell structure, being materially bonded to the lower side 5*b* of the base 5. In its relaxed or decompressed state, the foam tape 17 has a certain thickness T of between 8 mm and 15 mm, preferably between 10 mm and 12 mm, in particular 10 mm. In the installed state of the seal 1, the compressible foam tape 17 is pressed against the corrugated surface 2*a*, e.g., by driving screws (not shown) through the base 5, the foam tape 17 and the sidewall 2, while bending the bulb portion 7 upwardly away from the upper side 5*a* of the base 5 (FIG. 2A), or by using other fastening means, e.g., an adhesive tape 22 between the locating leg 12 and the transverse surface 2*e* of the sidewall 2, as shown in FIG. 7 for an alternative embodiment of the seal 1.

This leads to the foam tape 17 being compressed to a greater extent in the presence of a peak 2*c* in the corrugated surface 2*a* than in the presence of a valley 2*d* in the corrugated surface 2*a*. By appropriate fastening of the seal 1 to the sidewall 2 the pressure on the foam tape 17 is chosen such that the compressible foam tape 17 is in biased contact with the corrugated surface 2*a* of the sidewall 2 on its entire length, i.e., it is also protruding into the valleys 2*d* preventing gaps from being created between the seal 1 and the corrugated surface 2*a*. So, the foam tape 17 is more or less absorbing or taking the shape of the corrugated surface 2*a*.

Figures 3, 4:
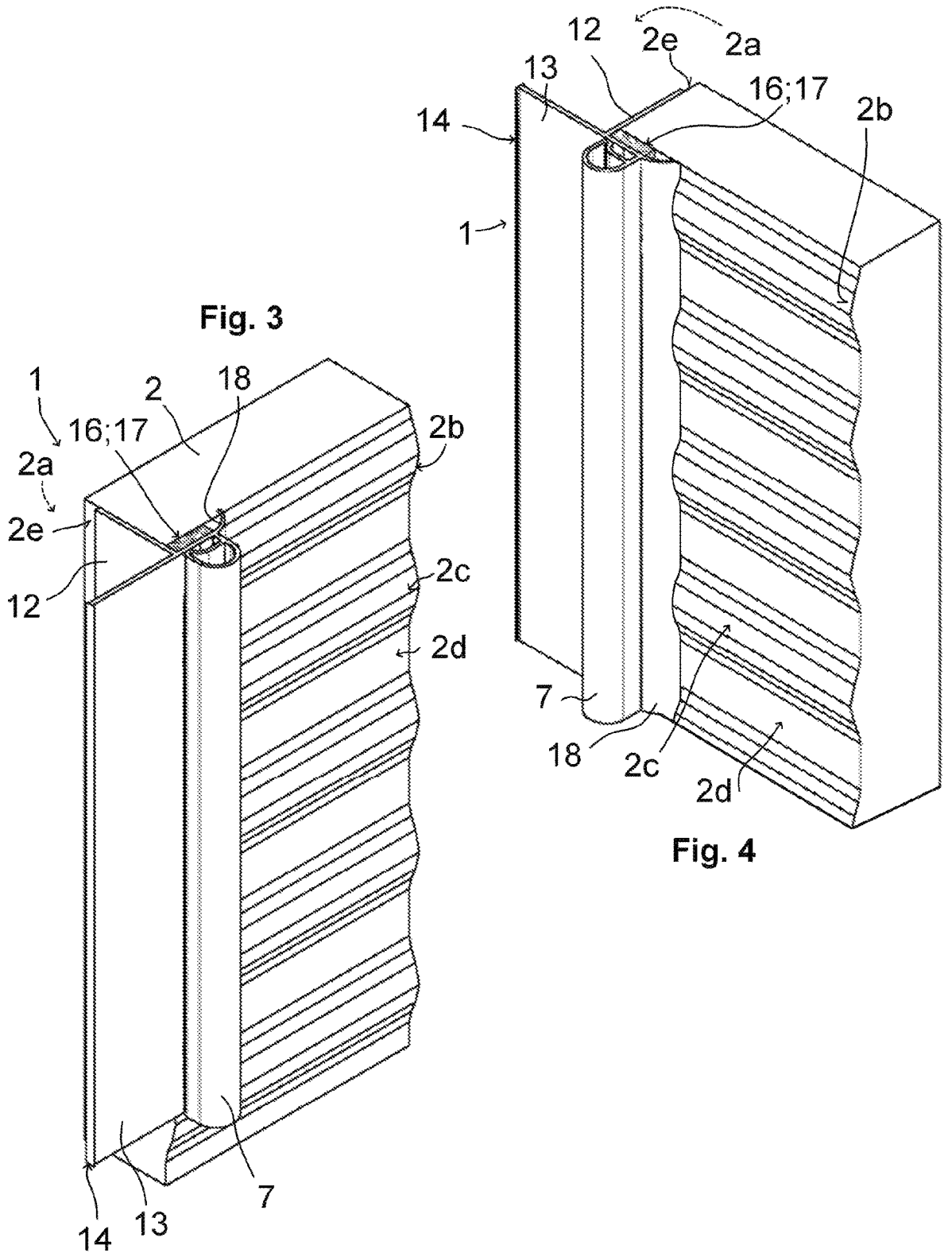
FIGS. 3 and 4 are perspective views of the elongated seal according to FIG. 1 attached to a corrugated sidewall.

According to this embodiment, a first flipper 18 having a proximal end 18*a* and a distal end 18*b* is integrally connected to the base 5 with its proximal end 18*a*. The first flipper 18 and the wiper 14 are integrally connected to the base 5 at opposing sides, such that the foam tape 17 is attached to the lower side 5*b* of the base 5 covered laterally (sideways) on opposite sides by the locating leg 12 and the first flipper 18. The first flipper 18 has a curved shape between the proximal end 18*a* and the distal end 18*b*, being (vertically) bent downwards in the direction of the compressible foam tape 17 or away from the lower side 5*b* of the base 5 in such a way that in the installed state of the seal 1, the distal end 18*b* of the first flipper 18 is in biased contact with the corrugated surface 2*a* at least at the peaks 2*c*, as also shown in FIGS. 3 and 4. Preferably, the distal end 18*b* is also protruding into the valleys 2*d* of the corrugated surface 2*a* or even is in biased contact with it. Consequently, the compressible foam tape 17 is at least partially, preferably completely, hidden sideways or laterally by the first flipper 18. Further, the first flipper 18 provides an additional sealing effect as it at least partially, preferably completely (if also in biased contact with the valleys 2*d*), prevents a fluid from leaking to the foam tape 17.

In order to achieve these effects described above, the first flipper 18 is bent or curved downwards such that a vertical distance D between the lower side 5*b* of the base 5 and the distal end 18*b* of the first flipper 18 equals or is larger than the thickness T of the compressible foam tape 17 in its decompressed state. Thus, compression of the foam tape 17 automatically results in biasing or pretensioning forces on the first flipper 18 pushing its distal end 18*b* against the corrugated surface 2*a* of the sidewall 2.

According to the embodiment shown in FIGS. 5, 6, 7, the compressible or flexible sealing member 16 that is located (vertically) underneath the lower side 5*b* of the base 5 is a combination of a resilient pressure body 19, e.g., a rubber body, in particular a body made of thermoplastic elastomers (TPE, TPO, SEBS), polyvinyl chloride (PVC) or ethylene propylene diene monomer (EPDM), and a distal end 20*b* of a second flipper 20, interacting with each other as follows: The pressure body 19 is integrally connected to or is one-piece with the lower side 5*b* of the base 5 and the second flipper 20 is integrally connected to the base 5 with its proximal end 20*a*.

Comparable to the embodiment of FIGS. 1 and 2, the second flipper 20 and the wiper 14 are integrally connected to the base 5 at opposing sides, such that the pressure body 19 attached to the lower side 5*b* of the base 5 is covered laterally on opposite sides by the locating leg 12 and the second flipper 20. The second flipper 20 has a curved shape between the proximal end 20*a* and the distal end 20*b* being bent downwards in a c-shaped manner such that the distal end 20*b* of the second flipper 20 is located (vertically) underneath the resilient pressure body 19.

Figure 5:
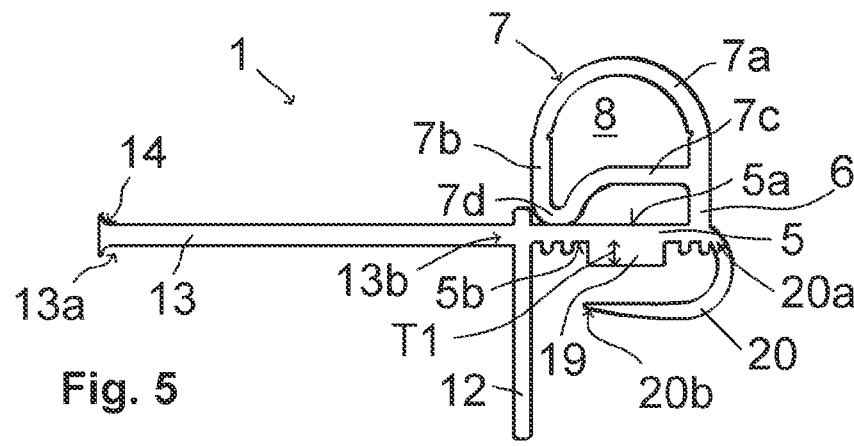
FIGS. 5-7 are sectional views of further embodiments of an elongated seal.
Figure 6:
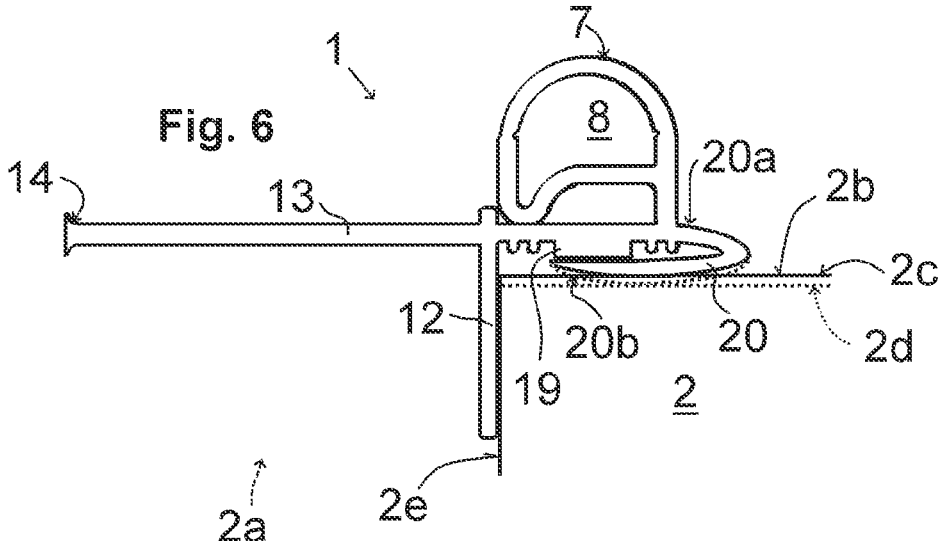

In the uninstalled state of the seal 1, shown in FIGS. 5 and 7, the distal end 20*b* of the second flipper 20 might be spaced apart from the resilient pressure body 19. In the installed state of the seal 1, shown in FIG. 6, the distal end 20*b* of the second flipper 20 and the pressure body 19 are interacting with each other. As shown in FIG. 6, the pressure body 19 is pressing the distal end 20*b* of the second flipper 20 against the corrugated surface 2*a*, i.e., against the peaks 2*c* as well as into the valleys 2*d* (dotted line). In this way, the distal end 20*b* of the second flipper 20 and the pressure body 19 in combination are absorbing or taking the shape of the corrugated surface 2*a*, providing a sealing effect. Consequently, in this embodiment, the compressible sealing member 16 is formed by a combination of the distal end 20*b* of the second flipper 20 and the resilient pressure body 19 interacting with each other through pressurized contact in the installed state of the seal 1. In addition, this compressible sealing member 16, i.e., the distal end 20*b* and the resilient pressure body 19, is covered laterally by the second flipper 20.

In order to provide sufficient pressure to the distal end 20*b* of the second flipper 20, a resilient pressure body 19 having a certain thickness T1 is provided allowing the distal end 20*b* of the second flipper 20 to be brought into contact with the corrugated surface 2*a* of the sidewall 2 on its entire length, i.e., preventing gaps from being created between the seal 1 and the corrugated surface 2*a*. To secure the seal 1 on the sidewall 2 and maintain the provided pressure to the compressible sealing member 16 (distal end 20*b* and resilient pressure body 19), screws (not shown) might be driven through the base 5, the pressure body 19, the distal end 20*b* and the sidewall 2. Alternatively, or additionally, other fastening means might be used in order to secure the seal 1 to the sidewall 2, e.g., an adhesive tape 22 between the locating leg 12 and the transverse surface 2*e* of the sidewall 2, as shown in FIG. 7.

Recreational vehicles are may be equipped with slide-out rooms that can be extended when the vehicle is parked, in order to expand the living space. Such slide-out rooms may be installed in openings of a sidewall of the vehicle, wherein an elongated seal or a sealing assembly provides that the opening is water sealed in the extended position as well as in the retracted position.

When attached to the sidewall of the vehicle, the slidably connected bulb seals can engage the slide-out room in order to form a waterproof connection in the extended position. Additional wipers of the elongated seal extend inwardly from the sidewall into the opening and rub against a sidewall of the slide out room to form an additional seal. However, in case the seal is attached to a corrugated sidewall the sealing may have challenges, as the seal is not structured lengthwise. Therefore, in comparative sealing assemblies, an additional flipper may be attached to the seal in longitudinal direction such that the seal maintains contact with the corrugated parts of the sidewall.

According to the present disclosure, an elongated seal for a sidewall is described, in particular a sidewall of a recreational vehicle. The sidewall has at least one corrugated surface with peaks and valleys having heights in the millimeter range, in particular, 5 mm to 8 mm, and a transverse surface extending substantially perpendicularly from the corrugated surface. The transverse surface is defining an opening in the sidewall for receiving a slide-out room that can be extended or retracted. In order to form a water-tight interface between both the seal is installed at the sidewall.

The seal comprises an elongated resilient base having an upper side and a lower side. Further, a bulb portion is integrally connected to the base in a cantilevered manner above the upper side of the base. The bulb portion has an arcuate portion extending into a sidewall portion and into an inner wall defining an enclosed space within the bulb portion. The bulb portion is movable between a first position in which the inner wall is substantially parallel to and spaced apart from the upper side of the base. Further, the bulb portion can be brought into a second position in which the bulb portion is bent away from the upper side of the base, in order to access the base from the upper side, e.g., for attaching the seal to the sidewall by screws.

A wiper is extending co-linearly to the base, wherein the wiper is integrally connected to the base via its proximal end that lies opposite to a distal end of the wiper. The distal end is defining a terminal end and is adapted to protrude into the opening of the sidewall for providing an additional sealing effect when rubbing against the sidewall of the slide-out room received in that opening. Further, a locating leg extends substantially perpendicularly to the base and substantially perpendicularly with respect to the wiper. The locating leg is integrally connected to the base and extends downwards from the lower side of the base, thus, in the opposite direction as the bulb portion.

A compressible sealing member extends at or underneath the lower side of the base being adapted to absorb or take the shape of the corrugated surface when the compressible sealing member is pushed against the corrugated surface in the installed state of the seal. Thus, due to its compressible nature, the sealing member located at the lower side or underneath the base is accepting the surface characteristics of the sidewalls corrugated surface being in the millimeter range, omitting gaps to be formed between the sidewall and the seal preferably on its entire length. Consequently, by selecting an appropriate resilient or compressible material for the compressible sealing member that is adapted to be compressed in the millimeter range, in particular, 5 mm to 8 mm, on applying a pressure, an effective sealing effect can be provided even the respective surface of the sidewall is not planar. Materials that can be used are thermoelastic polymers, e.g., polyethylene (PE), by way of example. Also, other resilient materials can be used. The compressible sealing member might be formed as a foam tape having a closed-cell structure or a combination of interacting resilient rubber bodies, each compressible sealing member being adapted to apply to the corrugated surface on applying a pressure.

In addition, a flipper is provided having a distal end and a proximal end, wherein the proximal end is integrally connected to the base opposite to the locating leg. The flipper is bent (vertically) downwards from the proximal end, i.e., away from the lower side of the base, and has a substantially concave curved shape between the distal end and the proximal end. As a consequence, the flipper is adapted to cover the compressible sealing member (laterally) sideways and, depending on its length, to also absorb or take the shape of the corrugated surface. This leads to a further protection of the compressible sealing member from the lateral side opposite to the locating leg, and to an additional sealing effect as water can be effectively kept away from the compressible sealing member by the flipper to a certain extent. Thus, the overall sealing effect of the seal can be improved.

Within the scope of the present disclosure, integrally connected means that the respective element is rigidly coupled to another element, directly or indirectly via another element.

An elongated seal comprises a base having an upper side and a lower side. Further, a bulb portion is integrally connected to the base in a cantilevered manner above the upper side of the base. The bulb portion has an arcuate portion extending into a sidewall portion and into an inner wall defining an enclosed space within the bulb portion. The bulb portion is movable between a first position in which the inner wall is substantially parallel to and spaced from the upper side of the base, and a second position in which the bulb portion is bent away from the upper side of the base. Further a wiper extends co-linearly to the base, wherein the wiper is integrally connected to the base via its proximal end being opposite to a distal end of the wiper. In addition, locating leg extends substantially perpendicularly to the base and substantially perpendicularly with respect to the wiper, the locating leg being integrally connected to the base and extending downwards from the lower side of the base. A compressible sealing member extending at or underneath the lower side of the base being adapted to absorb or take the shape of a corrugated surface when the compressible sealing member is pushed against the corrugated surface in an installed state of the seal. Further, a flipper is provided having a distal end and a proximal end, the proximal end being integrally connected to the base opposite to the locating leg and the flipper being bent downwards from the proximal end having a substantially concave curved shape between the distal end and the proximal end.

The following numbered clauses include embodiments that are contemplated and non-limiting:

Clause 1. An elongated seal for a sidewall, such as a sidewall of a recreational vehicle, the sidewall having at least one corrugated surface and a transverse surface extending substantially perpendicularly from the corrugated surface, wherein the transverse surface is defining an opening in the sidewall.

Clause 2. The elongated seal of clause 1, any other suitable clause, or any combination of suitable clauses, the seal comprising a base having an upper side and a lower side.

Clause 3. The elongated seal of clause 2, any other suitable clause, or any combination of suitable clauses, the seal further comprising a bulb portion integrally connected to the base in a cantilevered manner above the upper side of the base, the bulb portion having an arcuate portion extending into a sidewall portion and into an inner wall defining an enclosed space within the bulb portion, the bulb portion being movable between a first position in which the inner wall is substantially parallel to and spaced from the upper side of the base, and a second position in which the bulb portion is bent away from the upper side of the base.

Clause 4. The elongated seal of clause 3, any other suitable clause, or any combination of suitable clauses, the seal further comprising a wiper extending co-linearly to the base, the wiper being integrally connected to the base via its proximal end being opposite to a distal end of the wiper the distal end being adapted to protrude into the opening in the sidewall.

Clause 5. The elongated seal of clause 4, any other suitable clause, or any combination of suitable clauses, the seal further comprising a locating leg extending substantially perpendicularly to the base and substantially perpendicularly with respect to the wiper, the locating leg being integrally connected to the base and extending downwards from the lower side of the base.

Clause 6. The elongated seal of clause 5, any other suitable clause, or any combination of suitable clauses, the seal further comprising a compressible sealing member extending at or underneath the lower side of the base being adapted to absorb or take the shape of the corrugated surface when the compressible sealing member is pushed against the corrugated surface in an installed state of the seal.

Clause 7. The elongated seal of clause 6, any other suitable clause, or any combination of suitable clauses, the seal further comprising a flipper having a distal end and a proximal end, the proximal end being integrally connected to the base opposite to the locating leg and the flipper being bent downwards from the proximal end having a substantially concave curved shape between the distal end and the proximal end.

Clause 8. The elongated seal of clause 7, any other suitable clause, or any combination of suitable clauses, wherein the compressible sealing member is a foam tape being materially bonded to the lower side of the base.

Clause 9. The elongated seal of clause 8, any other suitable clause, or any combination of suitable clauses, wherein in the installed state of the seal the foam tape is adapted to be compressed to a greater extent in the presence of a peak in the corrugated surface of the sidewall than in the presence of a valley in the corrugated surface of the sidewall such that the compressible foam tape is adapted to absorb or to take the shape of the corrugated surface of the sidewall while being in biased contact with the corrugated surface.

Clause 10. The elongated seal of clause 8, any other suitable clause, or any combination of suitable clauses, wherein the foam tape has a vertical thickness of between 8 mm and 15 mm.

Clause 11. The elongated seal of clause 8, any other suitable clause, or any combination of suitable clauses, wherein the foam tape has a vertical thickness of between 10 mm and 12 mm.

Clause 12. The elongated seal of clause 8, any other suitable clause, or any combination of suitable clauses, wherein the foam tape has a vertical thickness of about 10 mm.

Clause 13. The elongated seal of clause 10, any other suitable clause, or any combination of suitable clauses, wherein the flipper is a first flipper having a proximal end and a distal end, the proximal end being integrally connected to the base opposite to the locating leg and the flipper being bent downwards from the proximal end having a substantially concave curved shape between the distal end and the proximal end, the first flipper being bent downwards such that a vertical distance between the lower side of the base and the distal end of the first flipper equals or is larger than the thickness of the compressible foam tape in its decompressed state.

Clause 14. The elongated seal of clause 13, any other suitable clause, or any combination of suitable clauses, wherein the compressible foam tape is at least partially, preferably completely, covered laterally on opposite sides by the locating leg and the first flipper.

Clause 15. The elongated seal of clause 13, any other suitable clause, or any combination of suitable clauses, wherein in the installed state of the seal the distal end of the first flipper is adapted to be in biased contact with the corrugated surface for absorbing or taking the shape of the corrugated surface of the sidewall at least in part.

Clause 16. The elongated seal of clause 7, any other suitable clause, or any combination of suitable clauses, wherein the flipper is a second flipper having a proximal end and a distal end and the compressible sealing member is a combination of a resilient pressure body and the distal end of the second flipper, adapted to interact with each other, the resilient pressure body, e.g., a rubber body, being integrally connected to the lower side of the base.

Clause 17. The elongated seal of clause 16, any other suitable clause, or any combination of suitable clauses, wherein the proximal end of the second flipper is integrally connected to the base opposite to the locating leg and the flipper being concavely bent downwards in a substantially c-shaped manner from the proximal end such that the distal end of the second flipper is located underneath the resilient pressure body.

Clause 18. The elongated seal of clause 17, any other suitable clause, or any combination of suitable clauses, wherein the resilient pressure body is at least partially, preferably completely, covered laterally on opposite sides by the locating leg and the second flipper.

Clause 19. The elongated seal of clause 17, any other suitable clause, or any combination of suitable clauses, wherein, in an uninstalled state or a force-free state of the seal, the distal end of the second flipper is spaced apart from the resilient pressure body in a vertical direction and, in the installed state of the seal, the pressure body and the distal end of the second flipper are adapted to interact with each other through pressurized contact in such a way that the pressure body is pressing the distal end of the second flipper against the corrugated surface for absorbing or taking the shape of the corrugated surface of the sidewall.

The invention claimed is:

1. An elongated seal for a sidewall of a recreational vehicle, the sidewall having at least one corrugated surface and a transverse surface extending substantially perpendicularly from the corrugated surface, wherein the transverse surface is defining an opening in the sidewall, the elongated seal comprising:

a base having an upper side and a lower side;

a bulb portion integrally connected to the base in a cantilevered manner above the upper side of the base, the bulb portion having an arcuate portion extending into a sidewall portion and into an inner wall defining an enclosed space within the bulb portion, the bulb portion being movable between a first position in which the inner wall is substantially parallel to and spaced from the upper side of the base, and a second position in which the bulb portion is bent away from the upper side of the base;

a wiper extending co-linearly to the base, the wiper being integrally connected to the base via its proximal end being opposite to a distal end of the wiper, the distal end being adapted to protrude into the opening in the sidewall;

a locating leg extending substantially perpendicularly to the base and substantially perpendicularly with respect to the wiper, the locating leg being integrally connected to the base and extending downwards from the lower side of the base;

a compressible sealing member extending at or underneath the lower side of the base being adapted to absorb or take the shape of the corrugated surface when the compressible sealing member is pushed against the corrugated surface in an installed state of the seal, wherein the compressible sealing member is a foam tape having a vertical thickness of between 8 mm and 15 mm, the foam tape being materially bonded to the lower side of the base;

wherein the elongated seal further comprises a flipper having a distal end and a proximal end, the proximal end being integrally connected to the base opposite to the locating leg and the flipper being bent downwards from the proximal end having a substantially concave curved shape between the distal end and the proximal end;

wherein the flipper is bent downwards such that a vertical distance between the lower side of the base and the distal end of the flipper equals or is larger than the thickness of the compressible foam tape in a decompressed state; and wherein the compressible foam tape is at least partially covered laterally on opposite sides by the locating leg and the flipper.

2. The elongated seal of claim 1, wherein in the installed state of the seal the foam tape is adapted to be compressed to a greater extent in the presence of a peak in the corrugated surface of the sidewall than in the presence of a valley in the corrugated surface of the sidewall such that the compressible foam tape is adapted to absorb or to take the shape of the corrugated surface of the sidewall while being in biased contact with the corrugated surface.

3. The elongated seal of claim 1, wherein the foam tape has the vertical thickness of between 10 mm and 12 mm.

4. The elongated seal of claim 3, wherein the foam tape has the vertical thickness of about 10 mm.

5. The elongated seal of claim 1, wherein in the installed state of the seal the distal end of the flipper is adapted to be in biased contact with the corrugated surface for absorbing or taking the shape of the corrugated surface of the sidewall at least in part.

6. The elongated seal of claim 1, wherein the flipper and the compressible sealing member is a combination of a resilient pressure body and the distal end of the flipper, adapted to interact with each other, the resilient pressure body being integrally connected to the lower side of the base.

7. The elongated seal of claim 6, wherein the proximal end of the flipper is integrally connected to the base opposite to the locating leg and the flipper being concavely bent downwards in a substantially c-shaped manner from the proximal end such that the distal end of the flipper is located underneath the resilient pressure body.

8. The elongated seal of claim 7, wherein the resilient pressure body is at least partially, preferably completely, covered laterally on opposite sides by the locating leg and the flipper.

9. The elongated seal of claim 7, wherein, in an uninstalled state or a force-free state of the seal, the distal end of the flipper is spaced apart from the resilient pressure body in a vertical direction and, in the installed state of the seal, the pressure body and the distal end of the flipper are adapted to interact with each other through pressurized contact in such a way that the pressure body is pressing the distal end of the flipper against the corrugated surface for absorbing or taking the shape of the corrugated surface of the sidewall.

10. An elongated seal for a sidewall of a recreational vehicle, the sidewall having at least one corrugated surface and a transverse surface extending substantially perpendicularly from the corrugated surface, wherein the transverse surface is defining an opening in the sidewall, the elongated seal comprising:

a base having an upper side and a lower side;

a bulb portion integrally connected to the base in a cantilevered manner above the upper side of the base, the bulb portion having an arcuate portion extending into a sidewall portion and into an inner wall defining an enclosed space within the bulb portion, the bulb portion being movable between a first position in which the inner wall is substantially parallel to and spaced from the upper side of the base, and a second position in which the bulb portion is bent away from the upper side of the base;

a wiper extending co-linearly to the base, the wiper being integrally connected to the base via its proximal end being opposite to a distal end of the wiper, the distal end being adapted to protrude into the opening in the sidewall;

a locating leg extending substantially perpendicularly to the base and substantially perpendicularly with respect to the wiper, the locating leg being integrally connected to the base and extending downwards from the lower side of the base;

a compressible sealing member extending at or underneath the lower side of the base being adapted to absorb or take the shape of the corrugated surface when the compressible sealing member is pushed against the corrugated surface in an installed state of the seal, wherein the compressible sealing member is a foam tape being materially bonded to the lower side of the base;

wherein the elongated seal further comprises a flipper having a distal end and a proximal end, the proximal end being integrally connected to the base opposite to the locating leg and the flipper being bent downwards from the proximal end having a substantially concave curved shape between the distal end and the proximal end such that a vertical distance between the lower side of the base and the distal end of the flipper equals or is larger than the thickness of the compressible foam tape in a decompressed state; and wherein the compressible foam tape is at least partially covered laterally on opposite sides by the locating leg and the flipper.

11. The elongated seal of claim 10, wherein the compressible foam tape is completely covered laterally on opposite sides by the locating leg and the flipper.

12. An elongated seal for a sidewall of a recreational vehicle, the sidewall having at least one corrugated surface and a transverse surface extending substantially perpendicularly from the corrugated surface, wherein the transverse surface is defining an opening in the sidewall, the elongated seal comprising:

a base having an upper side and a lower side;

a bulb portion integrally connected to the base in a cantilevered manner above the upper side of the base, the bulb portion having an arcuate portion extending into a sidewall portion and into an inner wall defining an enclosed space within the bulb portion, the bulb portion being movable between a first position in which the inner wall is substantially parallel to and spaced from the upper side of the base, and a second position in which the bulb portion is bent away from the upper side of the base;

a wiper extending co-linearly to the base, the wiper being integrally connected to the base via its proximal end being opposite to a distal end of the wiper, the distal end being adapted to protrude into the opening in the sidewall;

a locating leg extending substantially perpendicularly to the base and substantially perpendicularly with respect to the wiper, the locating leg being integrally connected to the base and extending downwards from the lower side of the base;

a compressible sealing member extending at or underneath the lower side of the base being adapted to absorb or take the shape of the corrugated surface when the compressible sealing member is pushed against the corrugated surface in an installed state of the seal; wherein the elongated seal further comprises a flipper having a distal end and a proximal end, the proximal end being integrally connected to the base opposite to the locating leg and the flipper being bent downwards from the proximal end having a substantially concave curved shape between the distal end and the proximal end;

wherein the compressible sealing member is a combination of a resilient pressure body and the distal end of the flipper, adapted to interact with each other, the resilient pressure body being integrally connected to the lower side of the base.

13. The elongated seal of claim 12, wherein the proximal end of the flipper is integrally connected to the base opposite to the locating leg and the flipper being concavely bent downwards in a substantially c-shaped manner from the proximal end such that the distal end of the flipper is located underneath the resilient pressure body.

14. The elongated seal of claim 12, wherein the resilient pressure body is at least partially covered laterally on opposite sides by the locating leg and the flipper.

15. The elongated seal of claim 12, wherein, in an uninstalled state or a force-free state of the seal, the distal end of the flipper is spaced apart from the resilient pressure body in a vertical direction and, in the installed state of the seal, the pressure body and the distal end of the flipper are adapted to interact with each other through pressurized contact in such a way that the pressure body is pressing the distal end of the flipper against the corrugated surface for absorbing or taking the shape of the corrugated surface of the sidewall.

* * * * *